United States Patent

Ang et al.

Patent Number: 6,112,848
Date of Patent: Sep. 5, 2000

[54] SOUND-DAMPENED AUTOMOBILE INTERIOR COMPONENTS AND METHODS FOR MAKING SAME

[75] Inventors: Leoncio C. Ang, Bloomfield Hills; Tim F. O'Brien, White Lake, both of Mich.

[73] Assignees: Chrysler Corporation, Auburn Hills; UT Automotive Dearborn, Inc., Dearborn, both of Mich.

[21] Appl. No.: 09/159,157

[22] Filed: Sep. 23, 1998

[51] Int. Cl.[7] .................................................. F16F 15/00
[52] U.S. Cl. ........................................... 181/207; 181/208
[58] Field of Search .................................. 181/207, 208, 181/209, 286, 290, 293, 294; 428/90

[56] References Cited

U.S. PATENT DOCUMENTS

| | | |
|---|---|---|
| 4,576,773 | 3/1986 | Azzola et al. . |
| 4,714,425 | 12/1987 | Lenhardt . |
| 4,994,311 | 2/1991 | Junker ........................................ 428/90 |
| 5,362,428 | 11/1994 | Tsujino et al. . |
| 5,489,461 | 2/1996 | Isawa et al. ................................ 428/90 |
| 5,948,499 | 9/1999 | Tsukada et al. ........................... 428/90 |

Primary Examiner—Khanh Dang

[57] ABSTRACT

An automobile interior component having sound-dampening characteristics has a contact area thereon which contacts a second interior plastic component during operation of the automobile resulting in noise. The interior plastic component has a thermoplastic elastomer self-adhered to the contact area to thereby dampen the noise created at the contact area. A method for making a sound-dampened interior plastic component includes extruding a body of thermoplastic elastomer through a die onto a contact area of an interior plastic automobile component and allowing the extruded body of thermoplastic elastomer to cool, solidify, and adhere to the interior plastic component.

10 Claims, 4 Drawing Sheets

SOUND-DAMPENED AUTOMOBILE INTERIOR COMPONENTS AND METHODS FOR MAKING SAME

BACKGROUND OF THE INVENTION

1. Field of the Invention

The present invention relates generally to sound-dampened automobile interior components and methods for making same and, more particularly, to sound-dampened automobile interior plastic components having sound-dampening material adhered thereto and methods for making same.

2. Description of the Related Art

In the design and manufacture of automobiles, the current trend is toward improving customer satisfaction which includes improving the quietness in the passenger compartment during operation of the automobile. Much of the noise in the passenger compartment may be a result of road noise and wind. However, a significant amount of noise may be created by interior plastic components in the passenger compartment, which either rub against, vibrate against, or otherwise contact each other, resulting in noises such as buzzing, squeaking, or rattling, all of which are irritating to the driver and passengers.

Current methods for reducing the noise created between two interior plastic components include the manual application of tape, foam, or rubber strips on the areas of the interior components which contacts another interior component. The foam typically has an adhesive backing thereon to assist in the application. The rubber strips are sometimes stapled to the interior component at periodic space intervals along the interior component.

Unfortunately, the current methods of sound dampening is a labor-intensive method, requiring an operator to manually apply the sound-dampening material to all of the interior components. In addition, manual application of the sound-dampening material may result, due to human error, in misplacement of the material and, therefore, a loss in sound-dampening effectiveness. It has also been noted that the tape or foam has sometimes exhibited poor adherence to the interior plastic component.

In addition, current sound-dampening materials are limited to the shapes and sizes available to the automobile manufacturer and sometimes, due to the material or to the method of application to the component, the sound-dampening method results in a less-than-aesthetic appearance.

A further disadvantage of many of the prior art methods of sound dampening interior plastic components is that the sound-dampening material and the sound-dampened interior plastic component are not recyclable.

There is, therefore, a need for improved ways to sound dampen the interior of an automobile which includes the provision of improved sound-dampened interior components.

Thus, one object of the present invention is to provide a sound-dampened automobile interior plastic component.

It is another object of the present invention to provide a sound-dampened automobile interior plastic component having aesthetic sound-dampening material accurately positioned thereon and well-adhered thereto, wherein the sound-dampening material may be any of many different shapes.

It is yet another object of the present invention to provide a sound-dampened automobile interior plastic component having sound-dampening material thereon, which sound-dampening material is recyclable.

It is still another object of the present invention to provide a sound-dampened automobile interior plastic component which is recyclable.

It is a further object of the present invention to provide a method for making a sound-dampened automobile interior plastic component having sound-dampening material aesthetically and well-adhered thereto, which method forms the sound-dampening material into the shape desired, requires less labor than current methods, and accurately positions the sound-dampening material on the interior component.

SUMMARY OF THE INVENTION

To achieve the foregoing objects, one embodiment of the present invention is an automobile interior part having sound-dampening characteristics comprising an automobile interior plastic component having a contact area thereon which contacts a second interior plastic component during operation of the automobile resulting in noise. The interior plastic component has a thermoplastic elastomer self-adhered to the contact area to thereby dampen the noise created at the contact area. The thermoplastic elastomer may be a body having, for example, the general shape of tubular, flat, L-shaped in transverse cross section, or U-shaped in transverse cross section.

Another embodiment of the present invention is a method for making a sound-dampening interior plastic component for an automobile. The method comprises the steps of extruding a body of thermoplastic elastomer through a die onto a contact area of an interior plastic automobile component and allowing the extruded body of thermoplastic elastomer to cool, solidify, and adhere to the interior plastic component. The contact area of the interior plastic component is an area which contacts a second interior plastic component during operation of the automobile resulting in noise.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

One embodiment of the present invention generally entails a sound-dampened automobile interior part formed of an automobile interior component. An automobile interior component is a component which is secured inside the passenger compartment of an automobile and which is not exposed to the outside. Examples of such interior components include engine covers and trim bezels, such as cluster covers for instrument panels.

The interior plastic component of interest in the present invention is one which has at least one contact area thereon which contacts a second interior plastic component during operation of the automobile resulting in undesirable noise. To provide the sound-dampening characteristic, the interior plastic component has a thermoplastic elastomer self-adhered to at least one contact area to thereby dampen the noise created at that contact area. The term "self-adhered" is used to mean that the thermoplastic elastomer contacts the interior plastic component directly without the use of other adhesives. One way to self-adhere a thermoplastic elastomer to an interior plastic component is by extruding the thermoplastic elastomer onto the interior plastic component.

The method of making the sound-dampened interior part, which method is another embodiment of the present invention, generally includes extruding a body of thermoplastic elastomer through a die onto a contact area of an interior plastic automobile component and allowing the extruded body of thermoplastic elastomer to cool, solidify, and adhere to the interior plastic component. Once again, the contact area is an area which contacts a second interior plastic component during operation of the automobile resulting in undesirable noise.

Figure 1:
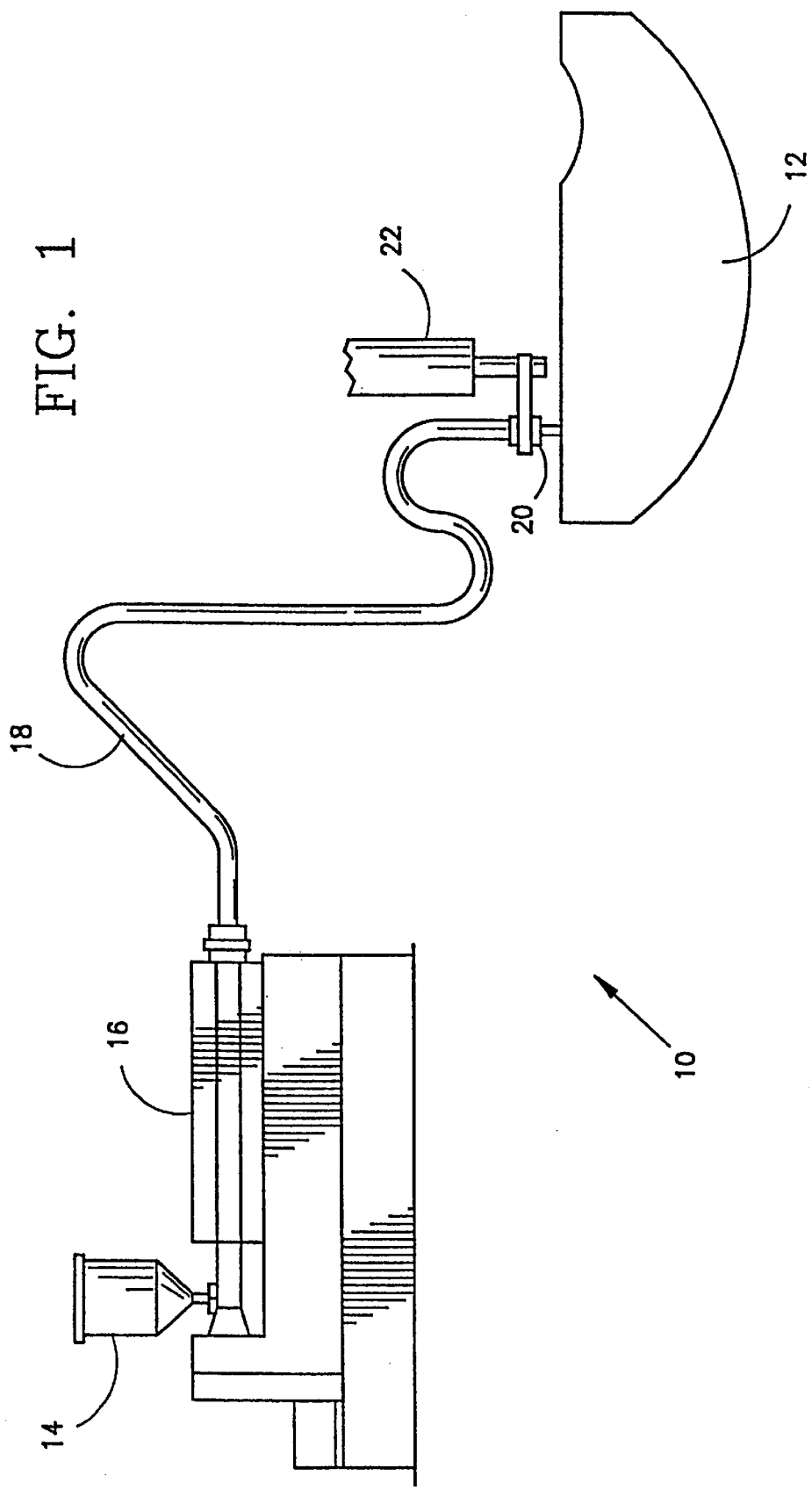
FIG. 1 is a side elevational view of an apparatus for conducting the method of the present invention.

The method of the present invention can be better understood with reference to FIG. 1 which shows apparatus 10 making a sound-dampened interior part by extruding thermoplastic elastomer onto interior plastic component 12.

Apparatus 10 generally includes hopper 14, extruder 16, flexible heated hose 18, and die 20. When conducting the method of the present invention, thermoplastic elastomer, typically in granulated form, is loaded into hopper 14. The thermoplastic elastomer may be, for example, a rubber-modified material based on the polymer polypropylene, polyethylene, and combinations thereof. A specific example of a thermoplastic elastomer useful in the present invention is "SANTOPRENE" 111-64, available from Advanced Elastomer Systems, L.P., Akron, Ohio. An advantage of using thermoplastic elastomer as the dampening material is that excess or scrapped material may be recycled and placed in the hopper. Thermoplastic elastomer from the hopper then enters extruder 16 where it is blended and heated to melt the thermoplastic elastomer.

The melted thermoplastic elastomer is then transferred under pressure from extruder 16 to die 20 via flexible, heated hose 18. Molten thermoplastic elastomer is then forced through die 20 onto interior plastic component 12. Die 20 is connected to robotic arm 22 so that robotic arm 22 can control the placement and movement of die 20. The movement of robotic arm 22 is controlled by computer programming. The robot may be programmed to move in predetermined patterns depending on the specific interior plastic component being processed. For example, if the interior plastic component is a cover for an instrument panel, the thermoplastic elastomer may be extruded around the entire perimeter of the cover on the side which will be attached to the instrument panel. In addition to robot arm 22 moving during the extrusion, the interior plastic component may be moved in a predetermined fashion, thus, allowing more control of the extrusion pattern.

Figure 2:
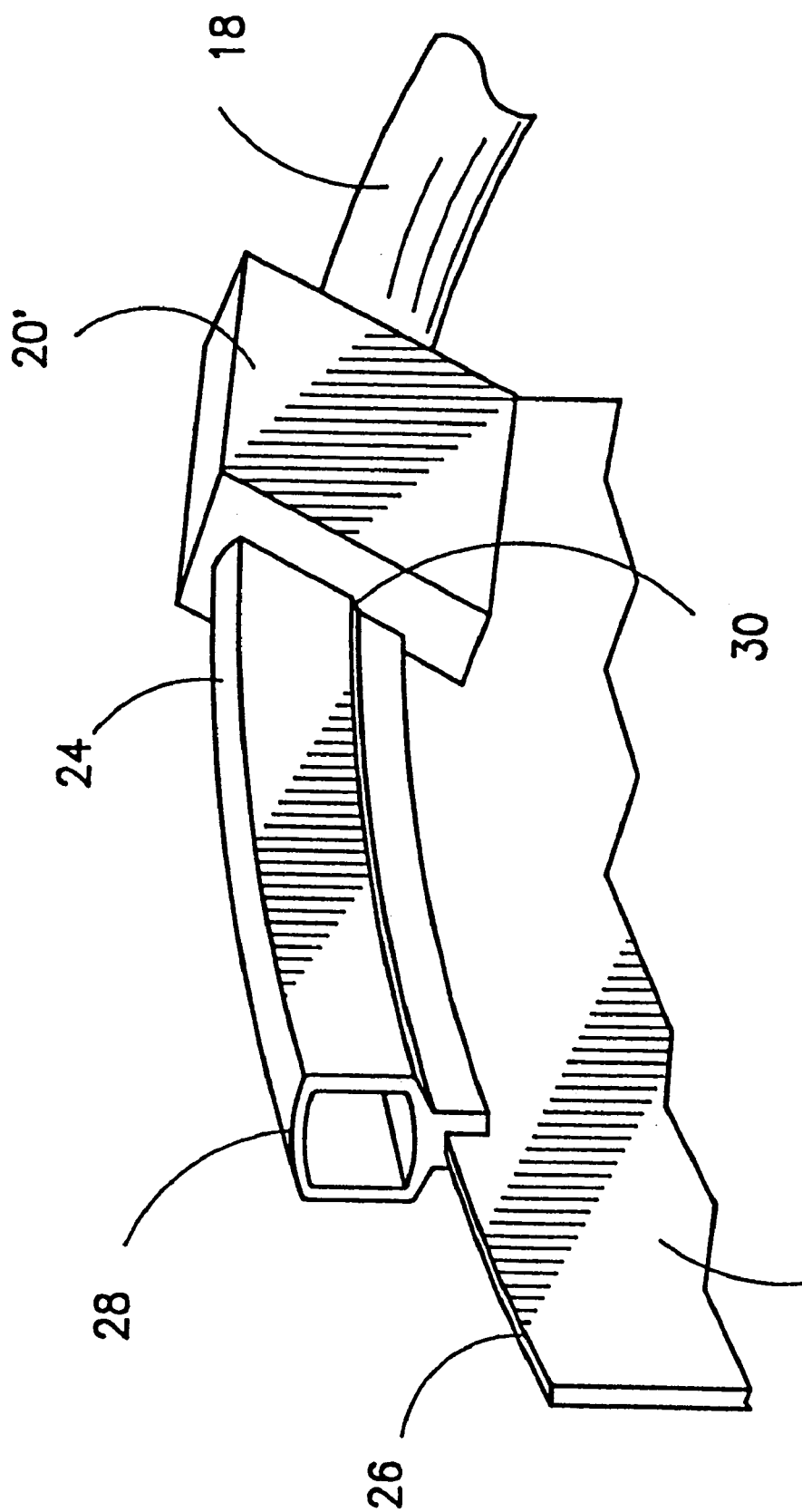
FIG. 2 is a perspective view of an interior plastic component (shown in part) having thermoplastic elastomer extruded thereon according to the present invention.

An illustrative example of thermoplastic elastomer exiting a die onto an interior plastic component is shown in FIG. 2. FIG. 2 shows thermoplastic elastomer being placed on edge 26 of interior plastic component 12' upon exiting die 20' which is connected to hose 18. The thermoplastic elastomer exiting die 20' is allowed to cool, typically in ambient atmosphere, and solidify, thus forming a thermoplastic elastomer body 28 in the form of a tubular bulb.

As is the case with the dies used in the method of the present invention, the shape of thermoplastic elastomer body 28 is controlled by the shape of outlet 30 of die 20'. Outlet 30 is shaped in the form of a bulb, which is the transverse cross section of thermoplastic elastomer body 28. Other possible shapes will be discussed herein below.

Upon solidification, the thermoplastic elastomer body adheres to the surface upon which it is applied, in this case, edge 26. Edge 26 is considered to be a surface having three substantially planar joined surfaces. Alternatively, the surface upon which the thermoplastic elastomer is applied may be substantially planar (generally flat), as depicted in FIG. 1, or the surface may be a corner which is two substantially planar joined surfaces. The surface upon which the thermoplastic elastomer is applied is not limited and may be essentially any texture or shape.

Upon cooling and solidification, the thermoplastic elastomer returns to its original flexible, elastomeric state. The thermoplastic elastomer body thus formed serves to dampen the sound created by two interior plastic components contacting one another. The thermoplastic elastomer body changes the vibrating energy (the cause of the noise) between the two plastic components into a heat energy which is absorbed by the thermoplastic elastomer body, thus eliminating or reducing the noise. In addition, noise is decreased when the thermoplastic elastomer body serves to decouple or isolate one plastic component from another plastic component.

In most instances, the thermoplastic elastomers are compatible with the plastic material of which the interior plastic component is formed such that the thermoplastic elastomer adheres well to the plastic component upon cooling. For example, polypropylene thermoplastic elastomer is compatible with thermoplastic polyolefins (polymers or copolymers based on ethylene or propylene), so that a polypropylene thermoplastic elastomer may be applied to an interior component formed of thermoplastic polyolefin and good adhesion will result. Furthermore, when the thermoplastic elastomer and the interior plastic component are compatible, the sound-dampened interior plastic components of the present invention are typically recyclable.

Figure 3:
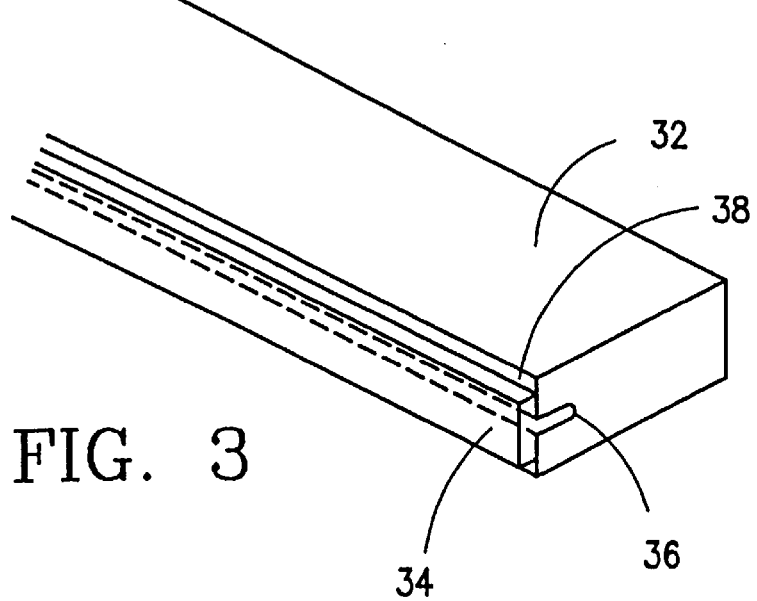
FIG. 3 is a perspective view of a thermoplastic elastomer body adhered to an interior plastic component according to an embodiment of the present invention.

In instances when the thermoplastic elastomer is not compatible to the degree desired, mechanical attachment designs may be incorporated into the structure of the sound-dampened interior plastic component and thermoplastic elastomer body. FIG. 3 illustrates one such mechanical attachment design incorporated into interior plastic component 32 and thermoplastic elastomer body 34. Interior plastic component 32 has elongated undercut 36 in side 38. Thermoplastic elastomer body 34 has been formed by the application of molten thermoplastic elastomer onto side 38 of component 32. During application of the molten thermoplastic elastomer, the thermoplastic elastomer fills undercut 36, thereby providing mechanical structure and additional surface area to improve the adhesion between the thermoplastic elastomer and component 32. Alternatively, undercut 36 may have an expanded region at the end of undercut 36 which is in the interior of component 32, providing further mechanical hold. Other possible mechanical attachment designs include a) tabs on the interior plastic component which would be encompassed by the thermoplastic elastomer and b) holes in the interior plastic component which would be filled with the thermoplastic elastomer. To recycle an interior plastic component when mechanical attachment designs are used, the thermoplastic elastomer may be simply separated from the plastic component before recycling the plastic component.

Alternative to using mechanical attachment designs, an adhesion promoter may be applied to the interior plastic component or may be incorporated into the thermoplastic elastomer composition to improve the adhesion between the thermoplastic elastomer and the interior plastic component.

Figure 4:
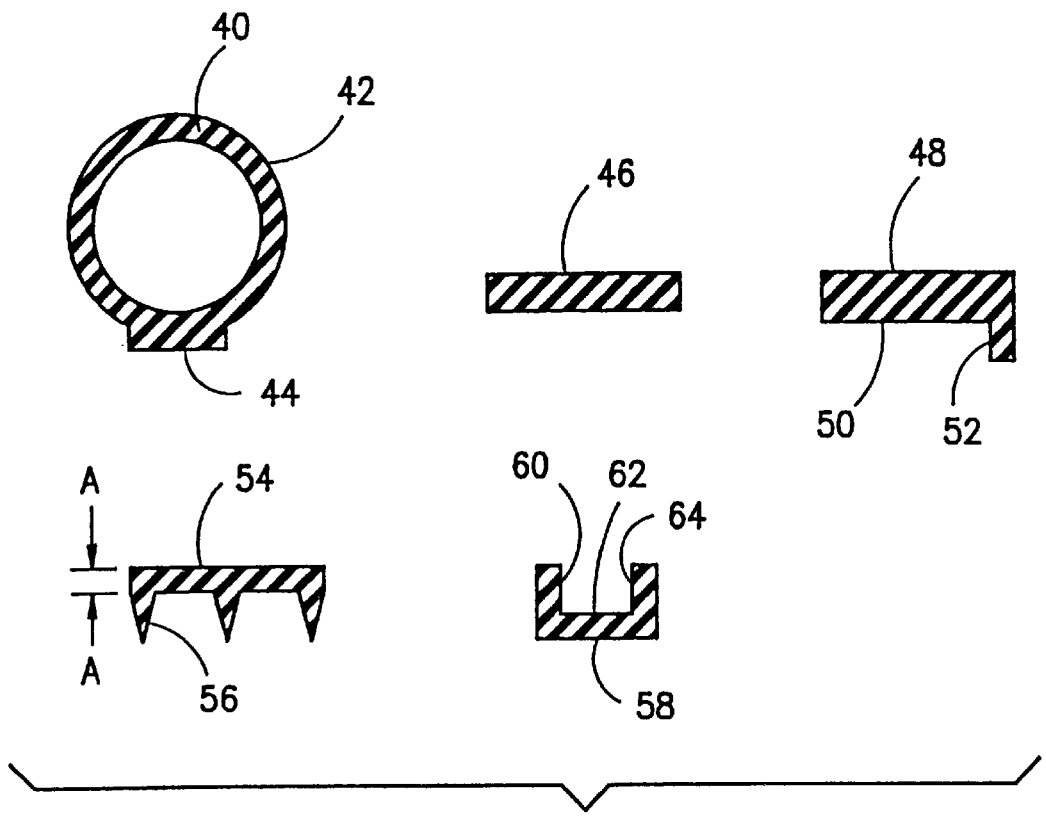
FIG. 4 shows cross sectional views of a variety of thermoplastic elastomer bodies made and used in embodiments of the present invention.

As mentioned above, the thermoplastic elastomer body may have any of many possible shapes. FIG. 4 shows the transverse cross sections of several possible thermoplastic elastomer body shapes. Thermoplastic elastomer body 40 is a tubular body having round portion 42 and flat portion 44. Flat portion 44 would be that portion which would be adhered to the interior plastic component. The advantages of employing such a shape are many. For instance, forming a tubular shape uses less material than a solid rod shape and the tubular shape cools and solidifies faster than a solid rod shape. In addition, when the second interior plastic component is placed on thermoplastic elastomer body 40, thermoplastic elastomer body 40 is capable of collapsing to allow for some tolerance in the construction of the two interior plastic components and to provide some cushioning during relative movement of the two components.

Thermoplastic elastomer body 46, shown in FIG. 4, is essentially a flat body having a rectangular cross section. This shape is especially suitable for application to flat surfaces.

Thermoplastic elastomer body 48 has an L-shaped transverse cross section having inner sides 50 and 52. Body 48 is especially suitable for application on a corner of an interior plastic component, where inner sides 50 and 52 adhere to two joining planar surfaces of a corner.

Thermoplastic elastomer body 54 has a transverse cross section which is rectangular with a plurality of fingers 56 thereon. The height A—A of the rectangle would ideally represent the typical distance between two adjacent interior plastic components. Fingers 56 are present to take up any tolerance in the distance between the two adjacent components. Fingers 56 are shown tapered away from the rectangular portion of body 54 which renders them more flexible. Other finger shapes are possible, as well as fewer fingers or more fingers than what is shown.

Thermoplastic elastomer body 58 has a U-shaped transverse cross section with inner sides 60, 62, and 64. Thermoplastic elastomer body 58 is especially suitable for application to an edge of an interior plastic component where inner sides 60, 62, and 64 are adhered to three joining planar surfaces of an edge.

The thermoplastic elastomer body shapes shown in FIG. 4 are only examples, as there are many other shapes which are suitable for the present invention. Other possible shapes that are not shown are those which are combinations of the shapes shown in FIG. 4.

Typically, the thermoplastic elastomer body has a wall thickness of from about 0.25 mm to about 2 mm and can otherwise have any other dimensions.

Figure 5A:
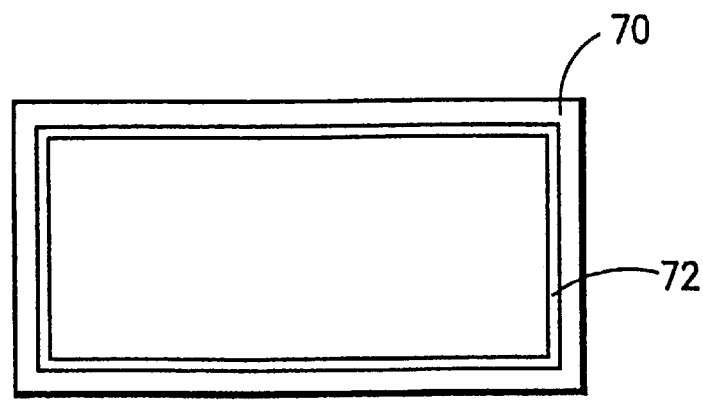
FIGS. 5A and 5B each show a plan view of an interior plastic component according to the invention having thermoplastic elastomer thereon.
Figure 5B:
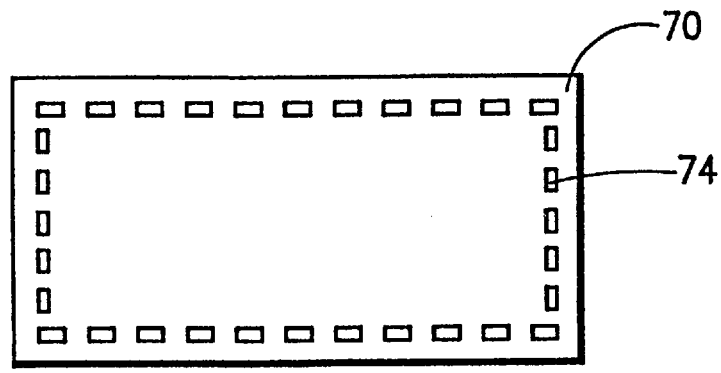

The thermoplastic elastomer may be applied to a contact area of an interior plastic component in a continuous or a discontinuous fashion. To illustrate these variations, FIG. 5A shows a plan view of interior plastic component 70 having continuous strip 72 of thermoplastic elastomer thereon, and FIG. 5B shows a plan view of interior plastic component 70 having discontinuous strip 74 of thermoplastic elastomer thereon.

Figure 6:
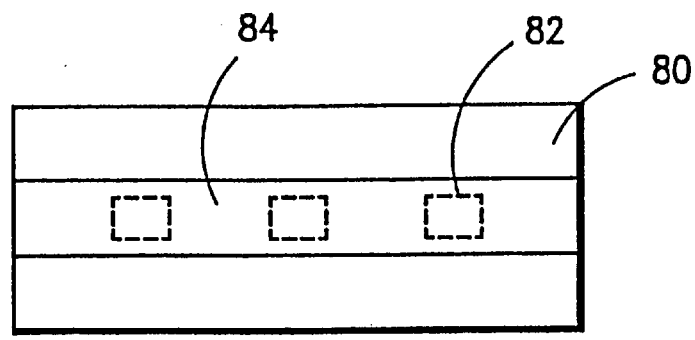
FIG. 6 shows a plan view of another application of the invention.

FIG. 6 shows a plan view of another application of the present invention in which interior plastic component 80 has holes 82 therethrough through which clips on another interior plastic component are to be inserted. Thin strip 84 of thermoplastic elastomer is adhered to interior plastic component 80 such that it covers holes 82. The clips on the second interior plastic component (not shown) may be pushed through thin strip 84 of thermoplastic elastomer (forming holes in thin strip 84) and through holes 82 to secure the two interior plastic components together. Thin strip 84 substantially reduces noise created between the two plastic components in the area of the clips.

Accordingly, the sound-dampened interior plastic components of the present invention have aesthetic sound-dampening material in the shape desired accurately positioned thereon and well-adhered thereto, uses recyclable sound-dampening material and is typically recyclable with the sound-dampening material. The present method for making a sound-dampened automobile interior component forms the sound-dampening material into the shape desired, requires less labor than current sound-dampening methods, and accurately positions the sound-dampening material on the interior component.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An automobile interior part having sound-dampening characteristics, comprising a first interior plastic component having a contact area thereon which contacts a second interior plastic component during operation of the automobile resulting in noise, the first interior plastic component having a thermoplastic elastomer self-adhered to the contact area to thereby dampen the noise created at the contact area.

2. The interior part of claim 1, wherein the thermoplastic elastomer is present along the contact area in a fashion selected from the group consisting of continuous and discontinuous.

3. The interior part of claim 1, wherein the thermoplastic elastomer is adhered to a surface selected from the group consisting of a substantially planar surface, a corner consisting of two substantially planar surfaces, and an edge consisting of three substantially planar surfaces.

4. The interior part of claim 1, wherein the thermoplastic elastomer is based on a polymer selected from the group consisting of polypropylene, polyethylene, and combinations thereof.

5. The interior part of claim 1, wherein the interior plastic component is selected from the group consisting of engine covers and trim bezels.

6. The interior part of claim 1, wherein the thermoplastic elastomer is generally in a shape selected from the group consisting of tubular, flat, L-shaped in transverse cross section, and U-shaped in transverse cross section.

7. The interior part of claim 6, wherein the thermoplastic elastomer has a finger thereon.

8. The interior part of claim 1, wherein the thermoplastic elastomer is a body which is secured to the interior plastic component in part by mechanical means.

9. The interior part of claim 8, wherein the mechanical means is, in part, present on the interior component and is selected from the group consisting of tabs on the interior component, holes in the interior component, and undercuts into the interior component.

10. An automobile interior part having sound-dampening characteristics, comprising a first interior plastic component having a contact area thereon which contacts a second interior plastic component during operation of the automobile resulting in noise, the first interior plastic component having a thermoplastic elastomer body self-adhered to the contact area to thereby dampen the noise created at the contact area, the thermoplastic elastomer body being generally in a shape selected from the group consisting of tubular, L-shaped in transverse cross section, and U-shaped in transverse cross section.

* * * * *